Sept. 23, 1958 W. GRÜBER 2,852,810
VULCANIZING APPARATUS FOR REPAIRING VEHICLE TIRES
Filed Oct. 22, 1956 7 Sheets-Sheet 1

Sept. 23, 1958 W. GRÜBER 2,852,810
VULCANIZING APPARATUS FOR REPAIRING VEHICLE TIRES
Filed Oct. 22, 1956 7 Sheets-Sheet 5

Fig. 5

INVENTOR.
W. Gruber
BY
Glascock Downing Seebold
ATTYS.

Sept. 23, 1958 W. GRÜBER 2,852,810
VULCANIZING APPARATUS FOR REPAIRING VEHICLE TIRES
Filed Oct. 22, 1956 7 Sheets-Sheet 6

Fig. 6

INVENTOR.
W. Gruber

United States Patent Office 2,852,810
Patented Sept. 23, 1958

2,852,810

VULCANIZING APPARATUS FOR REPAIRING VEHICLE TIRES

Wilhelm Grüber, Munich, Germany, assignor to Stahlgruber, Otto Gruber & Co., Munich, Germany Application October 22, 1956, Serial No. 617,580

16 Claims. (Cl. 18—18)

The present invention relates broadly to the art of repairing rubber goods, particularly tires for vehicles.

More particularly, this invention relates to apparatus for repairing vehicle tires by valcanization.

Vulcanizing apparatus for repairing rubber tires of motor vehicles generally include a hydraulically or mechanically actuated pressing shoe or plunger having a shape conforming to the profiled shape of the particular size of the tire or part thereof to be repaired. The plunger or shoe cooperates with a support or backing member also adapted to the particular tire size or to the contour of the interior of the particular size of the tire being repaired. In some instances the support is capable of automatically adapted itself to the tire profiile. In such arrangements either the plunger or shoe, or the support, or both components are heated either electrically or by the use of steam or hot air.

Known vulcanizers of this type have a number of deficiencies. Since the repair of tires presupposes that a plurality of different sizes of tires or tires of different profiled shapes must be repaired, utilizing the known type vulcanizers, the repairman is required to maintain in stock a large supply of different type pressing shoes or plungers and different sized plungers or shoes and supports.

It has been previously proposed to utilize steel bands, or link bands, applied to the exterior profile in an effort to eliminate the maintenance of a large stock of different sized parts. Utilizing such bands will permit the repair of different sized tires, but such arangement will not afford a satisfactory vulcanization in a short time, because with such band arrangements exterior heating cannot be effected, and further, the pressure-applying members cannot always be so placed as to obtain an application of pressure in a direction perpendicular to the surface to be repaired.

An additional drawback or deficiency particularly present in connection with the use of plunger type vulcanizers resides in the fact that since the pressure should be applied perpendicularly to the surface to be repaired, the pressing surface cannot be made of any size, but is limited to different maximum measurements in each apparatus. This limitation, in turn, limits the amount of surface of the tire which can be repaired. Additionally, the manipulation of known press type vulcanizers is intricate and time consuming, and is particularly difficult when the repairman is not an expert. Since only a limited area is placed under pressure and the known vulcanizers entirely lack adjustability or the adjustability is within such narrow limits that with small deviations in tire profiles, distribution of pressure does not occur in the proper manner, the pressure exerted by the plunger or shoe on the tire can easily cause distortions in the fabric of the tire to be repaired.

For the same reasons, the repair of a hole in a tire and the reinforcement of a tire by utilizing a covering patch can generally not be effected in a single operation. In known arrangements which use hot air or steam hoses or bags as a pressure member for repairing tires, it is necessary to utilize a special hose or bag for every size of tire to be repaired. Additionally, the life of such hoses or bags, according to experience, generally does not exceed seventy heat applications. The life of such heating bags is further shortened by the fact that the tires to be repaired generally exhibit considerable deviations in size and shape within any certain tire size.

Accordingly, it is the object of the present invention to provide a vulcanizing apparatus for repairing vehicle tires which can be produced economically, and will overcome the deficiencies of the prior art.

It is a further object of the invention to provide a vulcanizing apparatus which can be readily utilized even by unskilled workmen.

It is a particular object of this invention to provide a portable vulcanized for use in repairing vehicle tires which includes a frame arrangement adapted to engage the wheel rim of a mounted tire to be repaired, and supporting means and pressure-shoe means adapted to engage with the exterior of the tire and mounted thereon in such fashion that the inflated innertube of the tire to be repaired constitutes a support for the apparatus.

It is a specific object of the invention to provide a frame construction constituted of generally symmetrical arms of a pair of tongs, the outer ends of which are adapted for cooperation with the rim flanges of a wheel on which the tire to be repaired is mounted. It is a further object to provide a plurality of pressure shoes, preferably electrically heated, adapted to engage with the tread and side surfaces of the tire to be repaired, and means for applying pressure to such shoes including means for distributing the pressure so that the pressure is applied substantially uniformly by the shoes.

It is still more specifically an object of the invention to provide a vulcanizing apparatus including frame means adapted to engage with the rim of a wheel having an inflated tube and tire thereon, a support means for at least two pressure-applying members, one on each side of the tire, a plurality of contoured pressure shoes which can be engaged with the tread and side surfaces of the tire, and means for moving the pressure-applying members toward the tire to apply pressure to the shoes, including means for distributing the pressure in a uniform manner to press the respective shoes against the tire surfaces in a direction perpendicular to said surfaces.

It is still more specifically an object of the invention to provide in a vulcanizing apparatus as set forth in the preceding object a flexible band means adapted to engage with the shoes and adapted to be tensioned relative thereto to distribute pressure to the respective shoes.

Further and more specific objects will be apparent from the following description which is to be read with reference to the accompanying drawings in which—

Fig. 7 is a fragmentary top view of the components shown in Fig. 4; while

Figure 1:
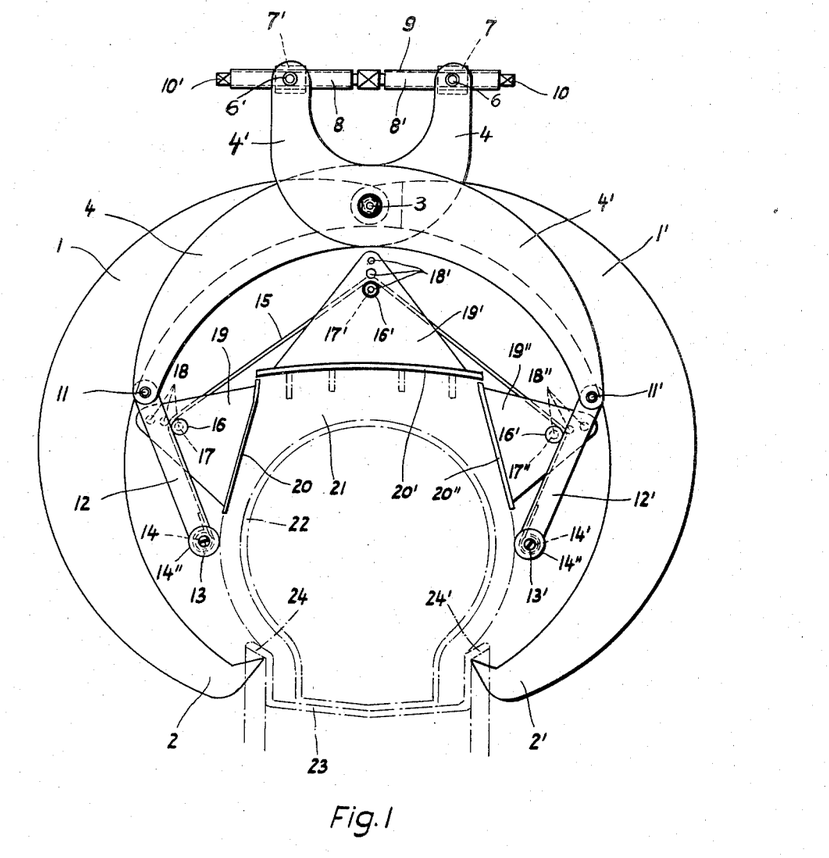
Fig. 1 is an end view of one embodiment of the invention as applied to a tire being repaired, indicated diagrammatically.
Figure 2:
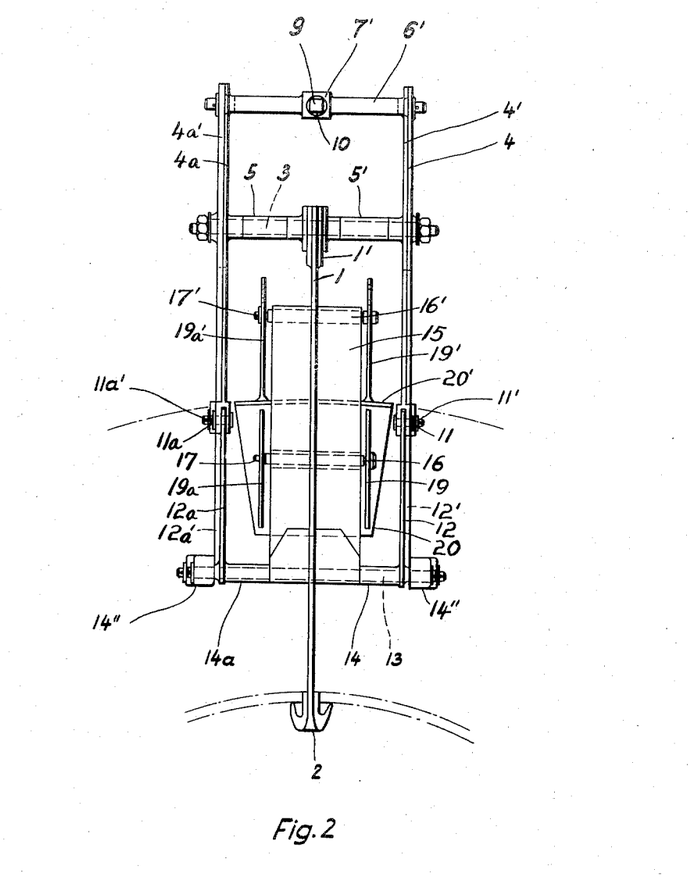
Fig. 2 is a side view of the arrangement of Fig. 1 as seen from the left of Fig. 1.
Figure 3:
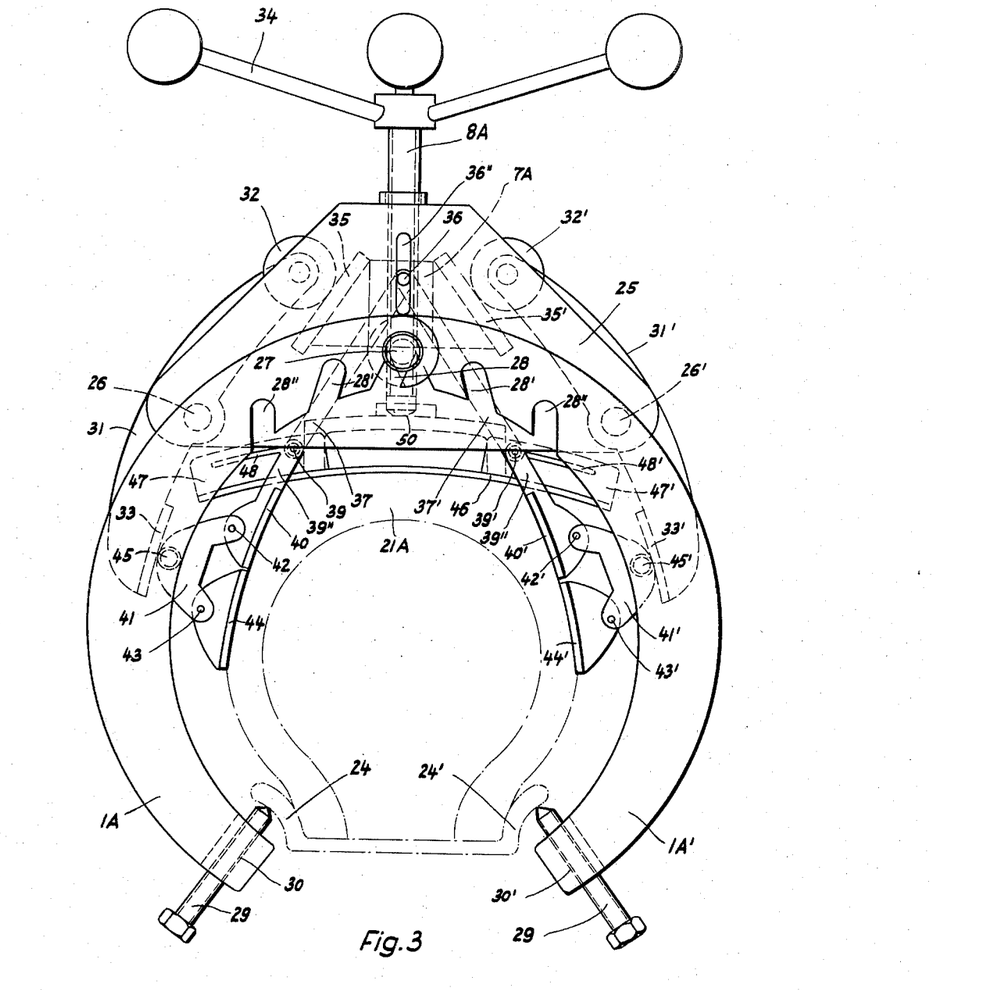
Fig. 3 is a view similar to Fig. 1, but illustrating a modified form of vulcanizer.

The vulcanizer apparatus illustrated in Figs. 1 and 2 includes a frame constituted by two supporting legs 1 and 1' which form a pair of tongs. The legs are arcuate in shape and their free ends form grippers 2 and 2' for engaging the opposite flanges 24, 24' of the wheel on which the tire to be repaired is mounted. The opposite ends of the legs are pivotally mounted on a bolt 3. Thus, leg 1' is forked while the other leg 1 fits between the forked ends of the first leg. Bolt 3 passes through apertures in the end portions of the legs. Bolt 3 likewise constitutes a shaft about which a scissorlike lever arrangement turns. The lever arrangement includes two pairs of associated levers 4 and 4' and 4a and 4a', respectively. The pairs of levers are held axially spaced from one another and from the legs or tongs 1 and 1' by spacing sleeves 5 and 5' mounted on bolt 3. A suitable washer and nut arrangement is provided at each free end of the bolt 3 so that the parts carried by the bolt are maintained in position. The parts of the levers above the pivot and lying on the respective sides of a plane passing perpendicularly through the bolt 3 and at right angle to the wheel are connected by pins 6 and 6'. The pin 6 connects the ends of levers 4 and 4a while the pin 6' connects the ends of levers 4' and 4a'. These pins are rotatable in eyes provided in the ends of the levers and are removably held in place by a washer and cotter pin arrangement. Bored and internally threaded enlargements 7 and 7' are provided intermediate the ends of each pin 6 and 6'. The threads within the enlargements are in engagement with oppositely directed threads 8 and 8' of an actuating spindle 9. The spindle 9 is provided with square end portions 10 and 10' to which a suitable key or wrench may be applied to turn the spindle and thus to open or close the scissorlike levers.

The free end of each scissorlike lever 4, 4' and 4a, 4a' is forked, and each forked end carries a guide arm 12, 12', and 12a, 12a', respectively which is pivotally connected thereto by a pivot pin 11, 11' and 11a, 11a', respectively. The free ends of the guide arms are each provided with an aperture in which bolt 13 and 13' is mounted. The opposite ends of a tensioning steel band 15 are secured to these bolts. The band is maintained in the center of bolts 13 and 13' by spacer sleeves 14, 14a and a similar pair of spacer sleeves of which only 14' is shown. The opposite ends of each bolt supports a roller 14" which engages the side of the tire to be repaired. It is thus clear that when spindle 9 is turned, the outer ends of the pairs of levers move toward and away from each other so that, when rollers 14" on the several guide arms engage with the side of the tire, these guide arms will alter their angular relation relative to the respective levers, thereby tightening or loosening the steel band 15 which is trained over rollers 16 and 16' and 16", respectively, which are rotatable on pins 17, 17', and 17". The pins can be adjustably mounted in one of a series of bores 18, 18', 18" provided in opposite ears or brackets 19, 19' and 19", as shown in Fig. 1, and the corresponding brackets at the rear thereof, including the brackets 19a and 19a', as shown in Fig. 2. The pairs of brackets or ears constitute parts of pressure shoes 20, 20', and 20", respectively, which are engaged on the surface of the tire 21 to be repaired.

The internal support for the vulcanizing apparatus of Fig. 1 is formed by the inflated innertube 22 which, together with the tire, is mounted in the usual manner on the wheel rim 23 which, in turn, is engaged beneath the rim flanges 24, 24' by the grippers 2 and 2' on the tongs or legs 1 and 1', respectively.

In utilizing the embodiment shown in Figs. 1 and 2, the tire to be repaired is conditioned for vulcanization in a conventional manner in that the unvulcanized rubber or a patch of unvulcanized rubber is placed on the area to be repaired. If desired, it can be placed on the interior of the tire while the inner tube is deflated, and before the tire is mounted on the rim. While the tire is deflated, the grippers on the tongs or legs 1 and 1' are engaged beneath the wheel flanges; after this, the innertube is inflated to normal pressure. Then the pressure shoes are adjusted to the particular size of tire by setting the pins 17, 17', 17" into one or the other of the series of apertures 18, 18', 18" in the brackets on each pressure shoe. The band 15 passing over the rollers 16, 16', and 16" holds the shoes in place on the tire profile. Then the spindle 9 is turned, whereby the movement of the scissorlike lever mechanism tightens band 15 and applies pressure on the rollers and thus on the pressure shoes in a direction perpendicular to the respective segments of the tire profile engaged by the shoes. Simultaneously, one or more, or all of the pressure shoes are electrically heated so that vulcanization occurs under pressure. Since electrically heated pressure shoes per se are known elements in vulcanizers, the various heating units and lead-in conductors are not shown in Figs. 1 and 2.

Figs. 3 to 7 illustrate a modified form of vulcanizing apparatus. This form, however, still retains the three basic components, namely, a frame means including two pivotally mounted levers or legs that are arcuate in shape and adapted to engage with the wheel rim, a threaded spindle for initiating pressure, a plurality of pressure shoes respectively engaging the tread and opposite side surfaces of a tire by means actuated in response to turning of the spindle for distributing pressure simultaneously to the plural pressure shoes.

Figure 4:
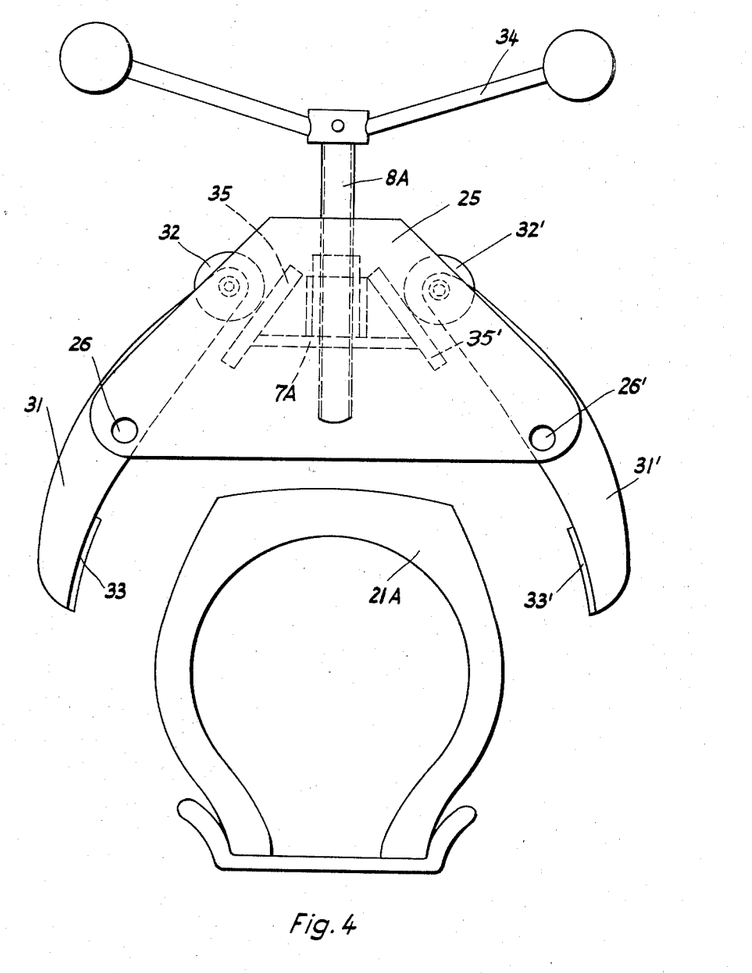
Fig. 4 is a fragmentary view only illustrating the pressure-applying components of the vulcanizer apparatus as shown in Fig. 3.
Figure 5:
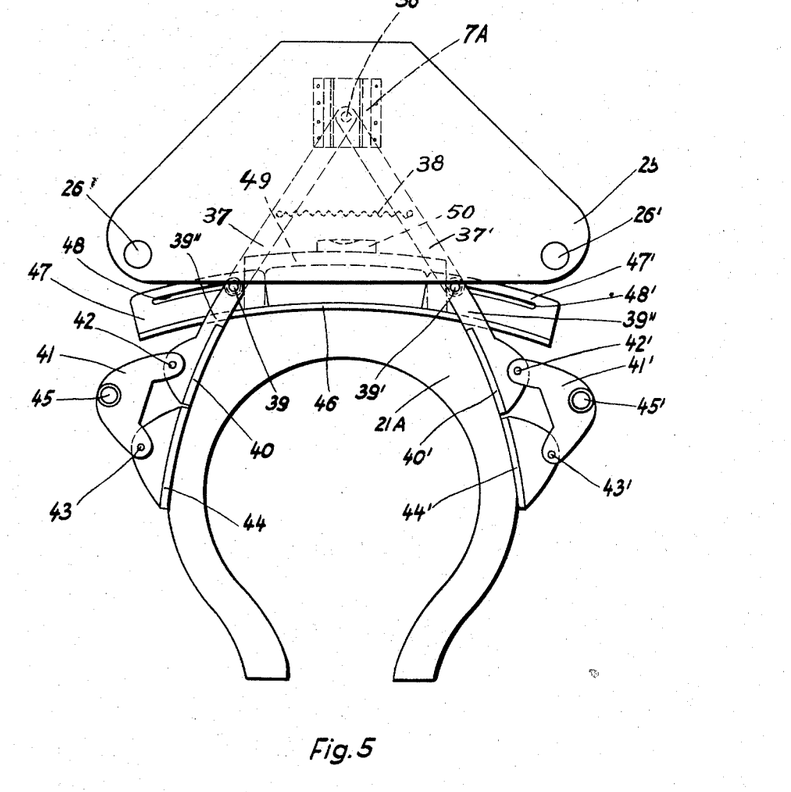
Fig. 5 is a view similar to Fig. 4 illustrating other components of the form as shown in Fig. 3.
Figure 6:
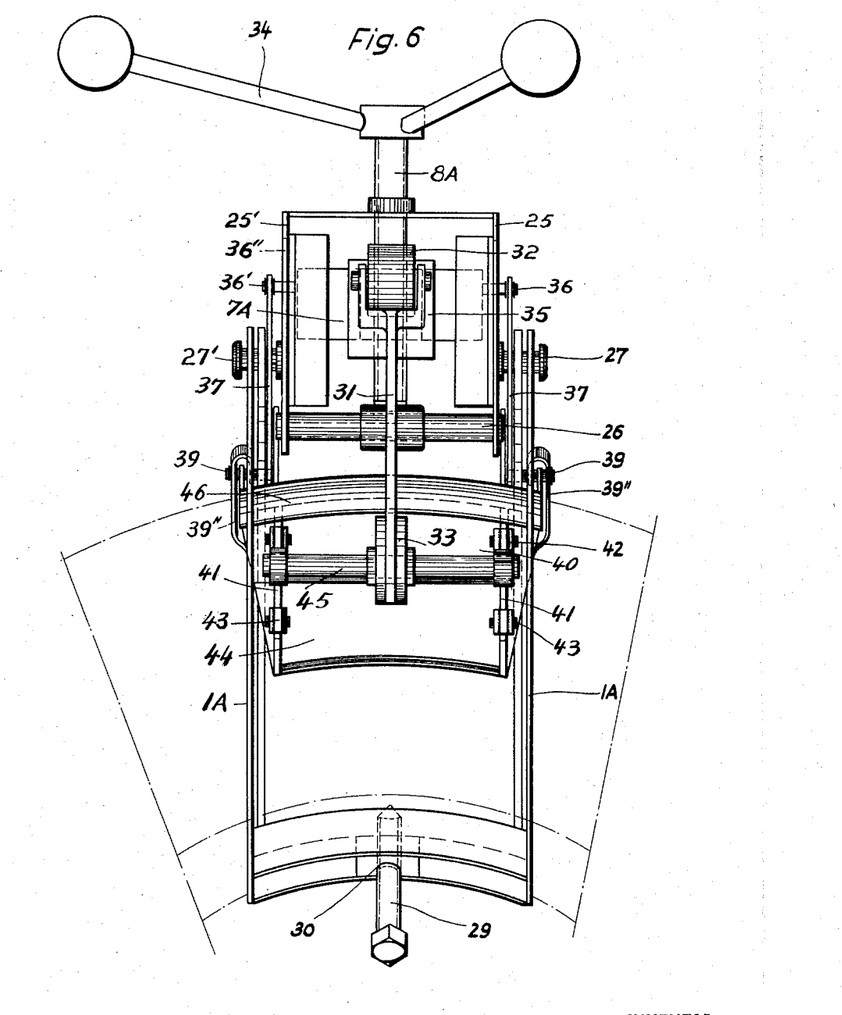
Fig. 6 is a side view of the arrangement of Fig. 3 as seen from the left of Fig. 3.
Figure 7:
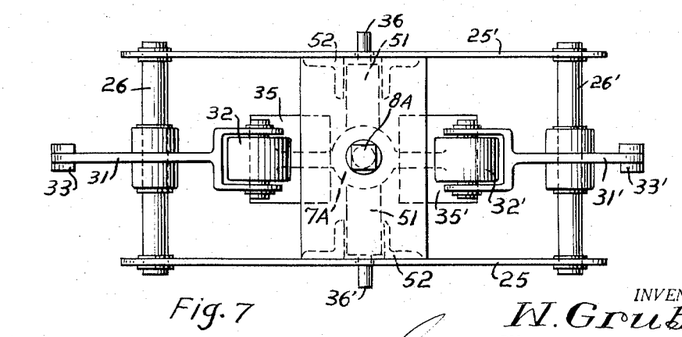

The arcuately shaped legs or tongs are denoted at 1A and 1A'. The outer ends of these tongs are bored and internally threaded at 30 and 30' to accommodate threaded bolts 29, 29' which engage the rim flanges 24, 24', respectively. The frame further includes a pair of spaced metal plates 25 and 25' which are connected by a pair of bolts 26, 26', as shown particularly in Fig. 7, which extend perpendicularly to the plane of the tongs. On the outer face of each plate a trunnion or pin 27, 27', respectively, is provided. The inner ends of the respective legs 1A and 1A' are slotted as at 28, 28', and 28". Thus, the inner ends can be adjusted to different positions on trunnion 27 so as to adapt the length of the legs to different tire sizes or to different rim sizes. The adjustability of the bolts 29 and 29' provides a further adjustment so that the frame can be mounted on tires and rims of various sizes. Each connecting pin 26, 26' has pivotally mounted thereon a double armed lever 31, 31', respectively. One end of each lever carries a pressure-applying face 33, 33', respectively, while the other end supports a roller 32, 32', respectively. Fig. 4, for the sake of clarity, illustrates the afore-described parts and further includes the screw spindle 8A turned by tommy bar 34 and an internally threaded sleeve nut 7A. The nut 7A is threaded on the spindle and has secured to its outside a pair of crossbars 51 which are diametrically opposed to each other and terminate at their outer ends in pins 36, 36' which are vertically slidable in opposite slots 36" in plates 25, 25' so as to permit nut 7A to move upwardly or downwardly without turning relative to the plates when spindle 8A is turned by means of tommy bar 34. For additional guidance and to relieve pins 36, 36', crossbars 51 may be slidably mounted between two opposite pairs of vertical guide members 52 which are secured to the inner walls of plates 25, 25', as shown in Fig. 7. At right angles to crossbars 51 and parallel to plates 25, 25', nut 7A further carries oppositely disposed, angularly inclined abutment members 35, 35' which, when the sleeve nut moves up along the spindle, bear against the rollers 32, 32' to press them outwardly and thus to rock the pressure applying faces 33, 33' toward one another. On the outer end of each pin 36, 36' and at the outside of plates 25, 25' there is further pivotally mounted a pair of levers 37, 37' which are held under tension relative to each other by spring means 38, as shown in Fig. 5. The free ends of the levers 37, 37' are pivotally coupled by pivots 39, 39' with arms 39"

carrying pressing shoes 40, 40'. It is to be understood that the opposite end of each pressure shoe is carried by arms which are pivotally coupled with a pair of levers similar to the levers 37, 37'. The pressure shoes 40, 40' are connected to an additional pair of pressure shoes 44, 44' by pairs of bridge members 41, 41'. The bridge members include opposite ears pivoted at 42 and 43, and 42' and 43', respectively, on the respective pressure shoes 40, 44 and 40', 44'. The bridge members of each pair are interconnected by bolts 45 and 45' which may be engaged by the pressure applying faces 33, 33'. Between the shield plates 25 an additional pressure shoe is provided which has upstanding pairs of flanges 47, 47' at opposite ends and a centrally positioned bracket or base 49 having on its top a recessed bearing member 50 which the free end of spindle 8A is adapted to engage. The flanges 47, 47' are slotted at 48, 48' and the pins 39, 39' which couple the levers 37, 37' on one side of the spindle axis with those on the other side of the spindle axis are movable in the slots. Thus when the spindle is turned to move the sleeve nut and its associated abutment members 35, 35' upwardly, the height of the triangle defined by the centers of pins 36, 39, 39' is increased and the base of the triangle is reduced. Pivot pins 39 and 39' therefore move from positions laterally outward of the inner ends of the slots 48, 48' to the position shown in Fig. 3. This movement facilitates the movement of pressure shoes 40 and 40' toward one another. When the lower end of screw spindle 8A bears on bearing 50, the bearing member 50 and the pressure shoe 46 are moved down simultaneously with the upward movement of sleeve nut 7A. Thus when the sleeve nut moves upwardly, the rollers 32, 32' are forced apart to cause the pressure-applying faces 33, 33' to bear against bolts 45, 45' so as to exert pressure on the side shoes.

Figure 8:
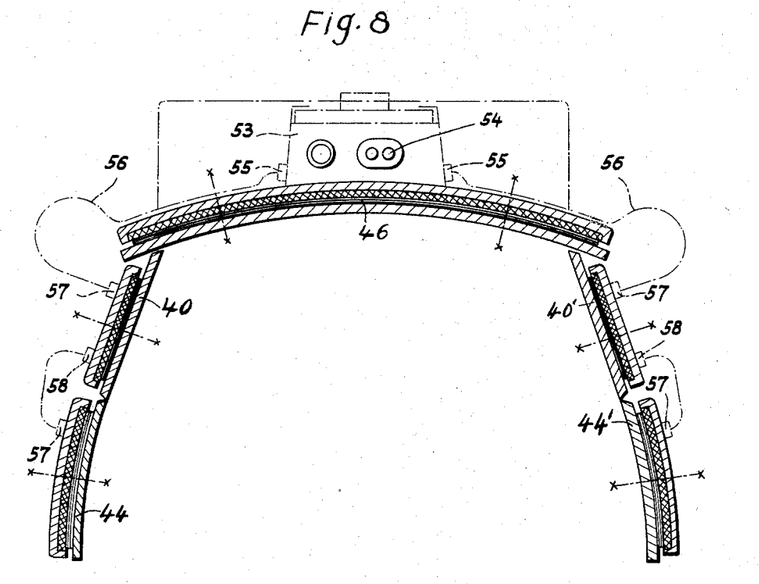
Fig. 8 is a diagrammatic cross-sectional view of the heating elements of the pressure shoes.

Fig. 8 finally shows a diagrammatical cross-sectional view of the heating elements for heating the pressure shoes 40, 40', 44, 44', and 46. The upper shoes 46 preferably serves as a support for an electric distributor 53 which may be connected by an outlet 54 to a source of electric current and is provided with suitable control means, as well as electric outlets 55 which may be connected by suitable conductors 56 to other outlets 57 on any of the lateral pressure shoes 40, 40', 44, or 44' which, in turn, may be interconnected with each other by other outlets 58. Such arrangement either permits any one of the pressure shoes to be heated separately or any two or more shoes to be heated simultaneously.

It is, therefore, clear that in both embodiments of the invention the rotation of a screw spindle causes the lever means to move toward one another to apply pressure to side shoes simultaneously with the application of pressure in a direction perpendicular to the tire tread by a tread-engaging shoe.

The embodiment shown in Figs. 3 to 7 is of simpler construction than that shown in Figs. 1 and 2 and includes a better adaptability to different sized tires and wheel rims.

The vulcanizing apparatus of the invention is not to be limited to the precise constructional arrangement disclosed in the drawings. Thus, for example, in the embodiment shown in Fig. 1 the tongs can be replaced by a U-shaped frame having adjustable legs for engaging beneath the rims. Alternately, an L-shaped frame member can engage one side and an adjustable leg can engage the other.

It is further possible to substitute a toggle-link mechanism for the scissorlike lever arrangement for tensioning the steel band.

The invention is not to be limited to a steel band as such, since generally, cable, or flexible link means can be utilized.

Additionally, the spindle drive for the tensioning mechanism can be replaced by hydraulic, pneumatic, or electrically actuated means such as a motor or an electromagnet.

In other words, the scope of the invention is not to be limited other than by the breadth and scope of the appended claims.

The vulcanizing apparatus of the invention, in comparison with known press type vulcanizers, has the following advantages:

(1) It is of simple and lightweight construction and therefore readily portable.

(2) It can be utilized by unskilled workmen.

(3) The relatively resiliently mounted pressing shoes substantially directly abut one another and therefore facilitate relatively large area repair work which can encompass the tread surface, as well as the opposite surfaces of a tire.

(4) In many instances it is not necessary to remove the tire to be repaired from the rim, nor is it necessary to remove the innertube from the tire.

(5) The pressure applied against the tread and respective side surfaces during vulcanization is substantially uniform so that the danger of fabric distortion is materially minimized, if not eliminated.

(6) Due to the adaptability of the pressure faces or shoes and the adjustability of these elements, tires of various sizes can be repaired by vulcanization; for example, five different sizes can be repaired with a single apparatus made according to the present invention. Thus, it is possible in a single operation to repair a hole in the side of a tire and simultaneously reinforce the tread surface of a limited area thereof along the periphery of the wheel.

It is further to be pointed out that the structural features of this invention make it possible to repair damaged tread and side wall surfaces by vulcanization without the necessity of removing the wheel carrying the tire to be repaired from the motor vehicle. This is particularly true in instances where the tread or side wall surfaces have been torn or gouged as a result of an injury which did not puncture the innertube.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. Vulcanizing apparatus for repairing wheel-mounted vehicle tires comprising a plurality of heated, pressure-applying shoes adapted to engage at least a circumferential portion of the tread and the adjacent side surfaces of a wheel-mounted and inflated tire and tube arrangement conditioned for repair, pressure-applying means movable toward and away from such a tire for applying the shoes against the tire surfaces underlying the same, a frame including components adapted to engage with the rim of the wheel of the tire and tube arrangement and to support the pressure-applying means relative to such a tire and means for moving the pressure-applying means toward the tire so that the pressure-applying means transmits pressure to the shoes in directions perpendicular to the tire surfaces underlying the respective shoes.

2. Vulcanizing apparatus as defined in claim 1 in which the frame components adapted to engage with the rim include a pair of substantially symmetrically shaped tong members having inner and outer ends, the outer ends being adapted to engage the rim of the wheel, and pin means radially outwards of such a tire to be repaired and supporting the inner ends of said tong members so that the outer ends of said tong members can move laterally toward and away from engagement with the rim of such a wheel-mounted tire.

3. Vulcanizing apparatus for repairing wheel-mounted vehicle tires comprising a plurality of heated, pressure-applying shoes adapted to engage at least a circumferential portion of the tread and the adjacent side surfaces of a wheel-mounted and inflated tire and tube arrangement conditioned for repair, pressure-applying means for applying the shoes against the tire surfaces underlying the same, a frame including components adapted to engage with the rim of the wheel of such a tire and tube arrangement and to support the pressure-applying means relative to such a tire, means for moving the pressure-applying means toward and away from such a tire so that in moving toward the tire the pressure-applying means transmits pressure to the shoes in directions perpendicular to the tire surfaces underlying the respective shoes, the means for moving the pressure-applying means including an actuating member adapted to be turned about its axis, and the pressure-applying means including lever means including end portions disposed on opposite sides of the tire and movable toward the same in response to a turning movement of the actuating member to apply pressure to at least to the shoes engaging the side surfaces of the tire.

4. Vulcanizing apparatus as claimed in claim 3 in which the lever means comprises at least one scissorlike lever arrangement, each shoe including a roller on the side thereof opposite the pressing face, each roller extending transversely of the axis of the wheel, the scissorlike lever arrangement further including a guide lever adapted to engage the respective side surfaces of the tire and a steel band having its opposite ends carried by the guide levers and its intermediate portion trained over the respective rollers whereby actuation of the scissorlike lever arrangement tensions the band to apply pressure uniformly to the respective shoes.

5. Vulcanizing apparatus as defined in claim 4, in which said rollers may be selectively mounted on said shoes at different distances from the underlying tire surface in accordance with the size of the tire to be repaired.

6. Vulcanizing apparatus for repairing wheel-mounted vehicle tires comprising a plurality of heated, pressure-applying shoes adapted to engage at least a circumferential portion of the tread and the adjacent side surfaces of a wheel-mounted and inflated tire and tube arrangement conditioned for repair, pressure-applying means for applying the shoes against the tire surfaces underlying the same, a frame including components adapted to engage with the rim of the wheel of such a tire and tube arrangement and to support the pressure-applying means relative to such a tire, means for moving the pressure-applying means toward and away from such a tire so that in moving toward the tire the pressure-applying means transmits pressure to the shoes in directions perpendicular to the tire surfaces underlying the respective shoes, said frame including a pivot pin means extending transversely of the axis of the wheel and disposed radially outwardly of the tire and a pair of symmetrical tong members having their respective inner ends pivotally mounted on said pin means and their outer ends adapted to engage with the rim of the wheel of such a tire and tube arrangement, said pressure-applying means comprising at least one scissorlike lever ararngement including crossed levers having their intermediate overlapped portions also pivotally mounted on said pin means, said crossed levers including adjacent ends disposed radially outwardly of the tire to be repaired and radially outwards of said pin means and opposite ends disposed laterally of such a tire, the means for moving the pressure-applying means including means for moving said adjacent ends relative to each other to impart movement to the opposite ends of said crossed levers, and means actuated by the movement of the opposite ends of the crossed levers for applying pressure to the respective shoes in response to the movement of said adjacent ends toward one another.

7. Vulcanizing apparatus for repairing wheel-mounted vehicle tires comprising a plurality of heated, pressure-applying shoes adapted to engage at least a circumferential portion of the tread and the adjacent side surfaces of a wheel-mounted and inflated tire and tube arrangement conditioned for repair, pressure-applying means for applying the shoes against the tire surfaces underlying the same, a frame including components adapted to engage with the rim of the wheel of such a tire and tube arnargement and to support the pressure-applying means relative to such a tire, means for moving the pressure-applying means toward and away from such a tire so that in moving toward the tire the pressure-applying means transmits pressure to the shoes in directions perpendicular to the tire surfaces underlying the respective shoes, and the pressure-applying shoes comprising electrically heated pressing elements having tire engaging faces of a shape in conformity with the shape of a portion of such a tire to be repaired.

8. Vulcanizing apparatus for repairing wheel-mounted vehicle tires comprising a plurality of heated, pressure-applying shoes adapted to engage at least a circumferential portion of the tread and the adjacent side surfaces of a wheel-mounted and inflated tire and tube arrangement conditioned for repair, pressure-applying means for applying the shoes against the tire surfaces underlying the same, a frame including components adapted to engage with the rim of the wheel of such a tire and tube arrangement and to support the pressure-applying means relative to such a tire, means for moving the pressure-applying means toward and away from such a tire so that in moving toward the tire the pressure-applying means transmits pressure to the shoes in directions perpendicular to the tire surfaces underlying the respective shoes, and the pressure-applying shoes adapted to engage the side surfaces comprising for each side surface at least two pressing elements pivotally interconnected together and supported by said frame.

9. Vulcanizing apparatus for repairing wheel-mounted vehicle tires comprising a plurality of heated, pressure-applying shoes adapted to engage at least a circumferential portion of the tread and the adjacent side surfaces of a wheel-mounted and inflated tire and tube arrangement conditioned for repair, pressure-applying means for applying the shoes against the tire surfaces underlying the same, a frame including components adapted to engage with the rim of the wheel of such a tire and tube arrangement and to support the pressure-applying means relative to such a tire, means for moving the pressure-applying means toward and away from such a tire so that in moving toward the tire the pressure-applying means transmits pressure to the shoes in directions perpendicular to the tire surfaces underlying the respective shoes, said pressure-applying means including a pair of lever means having first end portions movable relative to the side surfaces of such a tire means, means for moving the pressure-applying means comprises means for moving said lever means and means carried by said first end portions for applying pressure to at least the shoes engaging the sides of the tire.

10. Vulcanizing apparatus as defined in claim 9, in which the means for moving the levers includes a spindle mechanism having its axis perpendicular to the axis of a tire to be repaired, a sleeve nut axially movable along said spindle mechanism, opposite abutment members carried by said sleeve nut, said lever means having abutment members carried at their other end portions and adapted to be engaged by the first mentioned abutment members responsive to movement of said sleeve nut away from said tread surface to move said first end portions of the lever means in a pressure-applying direction.

11. Vulcanizing apparatus as defined in claim 10, in which the shoes for engaging the side surfaces of a tire comprise a pair of shoes for each side surface, a bridge means pivotally interconnecting each pair, and said first end portions of said lever means including pressure-applying faces engaging the bridge means so as to apply pressure to the respective pairs of shoes.

12. Vulcanizing apparatus as defined in claim 11, in which the screw spindle directly engages the shoe which engages the tread surface.

13. Vulcanizing apparatus for repairing wheel-mounted vehicle tires comprising a plurality of heated, pressure-applying shoes adapted to engage at least a circumferential portion of the tread and the adjacent side surfaces of a wheel-mounted and inflated tire and tube arrangement conditioned for repair, pressure-applying means for applying the shoes against the tire surfaces underlying the same, a frame including components adapted to engage with the rim of the wheel of such a tire and tube arrangement and to support the pressure-applying means relative to such a tire, means for moving the pressure-applying means toward and away from such a tire so that in moving toward the tire the pressure-applying means transmits pressure to the shoes in directions perpendicular to the tire surfaces underlying the respective shoes, the shoe for engaging the tread surface including upstanding flange means opposite to the pressure-applying face and at least at the opposite lateral portions thereof, said flange means having slots therein extending transversely of the tire to be repaired, the pressure-applying means including a screw spindle adapted to engage directly with said shoe, a sleeve nut means threaded on said spindle and movable axially along the same and away from the tread surface responsive to a turning movement of the spindle, a pair of levers including load-applying ends mounted for movement relative to the shoes engaging the side surfaces of the tire, means carried by the sleeve nut and engaging the opposite ends of the respective levers to move their load-applying ends toward the sides of the tires in response to actuation of the screw spindle, guide means pivotally connected to the side shoes and including pin means associated with the respective slots in said flange means for movement along said slots, and a lever extending from each pin means toward the sleeve nut, said last mentioned levers being connected with said sleeve nut and to each other.

14. Vulcanizing apparatus for repairing wheel-mounted vehicle tires comprising a plurality of heated, pressure-applying shoes adapted to engage at least a circumferential portion of the tread and the adjacent side surfaces of a wheel-mounted and inflated tire and tube arrangement conditioned for repair, pressure-applying means for applying the shoes against the tire surfaces underlying the same, a frame including components adapted to engage with the rim of the wheel of such a tire and tube arrangement and to support the pressure-applying means relative to such a tire, means for moving the pressure-applying means toward and away from such a tire so that in moving toward the tire the pressure-applying means transmits pressure to the shoes in directions perpendicular to the tire surfaces underlying the respective shoes, the frame components adapted to engage with the rim of the wheel comprising a pair of symmetrically shaped tongs, a pin means supported outwardly of the tread surface of a tire to be repaired and extending transversely of the axis of the wheel mounting such a tire, each arm of the tongs having an inner edge facing such tire, the inner edge of each arm having slots extending inwardly from the edge and at spaced intervals along said inner edge, whereby the tongs are adjustably positioned on the pin means in accordance with varying tire sizes, and set screw means carried at the free ends of the tongs for adjustable engagement with the rim of such wheel.

15. Vulcanizing apparatus for repairing wheel-mounted and inflated vehicle tires comprising at least one pair of tongs, pin means interconnecting and supporting said tongs at one of their ends for movement about an axis transverse to the axis of a tire to be repaired, said first axis being located radially outwardly of such a tire, the opposite end of each of said tongs being adapted to engage the wheel of such mounted and inflated tire to be repaired, a first pressure-applying shoe means adapted to engage with the tread surface of such tire, side pressure-applying shoe means adapted to engage with the respective opposite side surfaces of such tire adjacent the tread surface engaged by said first shoe means, a lever arm means cooperating with each side pressure-applying shoe means, and supported for movement relative to the opposite sides of such tire to be repaired, and means for applying pressure to all of said shoe means, including means for moving the lever arm means toward the sides of such a tire, and said pressure-applying means exerting pressure on all shoe means in directions perpendicular to the respective tire surfaces underlying the respective shoe means.

16. In vulcanizing apparatus for repairing wheel-mounted and inflated vehicle tires, the improvement comprising a frame including pin means disposed radially outwardly of a tire to be repaired and extending transversely of the tire axis, a pair of tongs carried by the pin means and adapted to engage with the rim of the wheel supporting such tire, at least one pressure-applying shoe adapted to engage with the respective side surfaces of such a tire and the tread surface intermediate said side surfaces, crossed lever means carried by said pin means including adjacent ends radially outwardly of the pin means and pressure-applying ends disposed adjacent the side surfaces of such a tire, movable guide members carried by the last mentioned ends of said lever means and adapted to engage with the side surfaces of a tire, tensioning means connected to the respective guide members and engaging the respective shoe means and means for moving the adjacent ends of said crossed lever means toward one another to tension said tensioning means and apply pressure simultaneously to all of said shoe means in directions perpendicular to the tire surfaces underlying the same.

References Cited in the file of this patent

UNITED STATES PATENTS

| 1,016,778 | Rose | Feb. 6, 1912 |
| 1,392,645 | Johnson | Oct. 4, 1921 |
| 1,966,766 | Raby | July 17, 1934 |
| 2,421,098 | Vogt | May 27, 1947 |

FOREIGN PATENTS

| 354,612 | Germany | June 12, 1922 |